United States Patent
Messerlie et al.

(10) Patent No.: US 11,481,972 B2
(45) Date of Patent: Oct. 25, 2022

(54) METHOD OF PERFORMING DENDROMETRY AND FOREST MAPPING

(71) Applicant: UNITED STATES OF AMERICA AS REPRESENTED BY THE SECRETARY OF AGRICULTURE, Washington, DC (US)

(72) Inventors: Edward Carl Messerlie, Missoula, MT (US); Jenny Perth, Missoula, MT (US); Lucas Aaron Wells, Missoula, MT (US); Woodam Chung, Corvallis, OR (US)

(73) Assignees: UNITED STATES OF AMERICA AS REPRESENTED BY THE SECRETARY OF AGRICULTURE, Washington, DC (US); OREGON STATE UNIVERSITY, Corvallis, OR (US)

( * ) Notice: Subject to any disclaimer, the term of this patent is extended or adjusted under 35 U.S.C. 154(b) by 137 days.

(21) Appl. No.: 16/249,529

(22) Filed: Jan. 16, 2019

(65) Prior Publication Data

US 2019/0221033 A1    Jul. 18, 2019

Related U.S. Application Data

(60) Provisional application No. 62/618,158, filed on Jan. 17, 2018.

(51) Int. Cl.
*G06T 17/05*    (2011.01)
*G06T 7/62*    (2017.01)
(Continued)

(52) U.S. Cl.
CPC ............... *G06T 17/05* (2013.01); *G06T 7/12* (2017.01); *G06T 7/593* (2017.01); *G06T 7/62* (2017.01);
(Continued)

(58) Field of Classification Search
CPC .. G06T 17/05; G06T 7/62; G06T 7/12; G06T 7/593; G06T 17/00; G06T 7/149;
(Continued)

(56) References Cited

U.S. PATENT DOCUMENTS

2007/0291994 A1* 12/2007 Kelle .................... G01S 7/4802
382/110
2017/0206415 A1* 7/2017 Redden ................ H04N 13/128
(Continued)

*Primary Examiner* — Umair Ahsan
(74) *Attorney, Agent, or Firm* — Nath, Goldberg & Meyer; Joshua B. Goldberg (57) ABSTRACT

The method of performing dendrometry and forest mapping utilizes a stereoscopic camera system, coupled with a machine vision system, to determine the diameters at breast height of selected trees in a forest, based solely on calculations performed from recorded digital image data, as well as to generate a map showing the coordinates and calculated diameters of the selected trees in the forest. A ground plane is first determined, and then bounding box coordinates are generated about selected tree stems of the recorded images. The bounding boxes are evolved to determine stem edges of the selected tree stems, and the diameter of each tree at breast height is then determined. Geographic location data is acquired for each tree, allowing a map to be generated which shows the location of each selected tree, along with a tag representative of geolocation data and corresponding diameter data.

20 Claims, 10 Drawing Sheets

(51) Int. Cl.
*G06T 7/593* (2017.01)
*G06K 9/46* (2006.01)
*G06T 7/12* (2017.01)
*G06T 17/00* (2006.01)
*G06T 7/149* (2017.01)
*G06V 10/44* (2022.01)

(52) U.S. Cl.
CPC .............. *G06T 17/00* (2013.01); *G06V 10/44* (2022.01); *G06T 7/149* (2017.01); *G06T 2207/10012* (2013.01); *G06T 2207/10028* (2013.01); *G06T 2207/20084* (2013.01); *G06T 2207/30188* (2013.01); *G06T 2210/12* (2013.01); *G06T 2210/56* (2013.01)

(58) Field of Classification Search
CPC . G06T 2207/10012; G06T 2207/10028; G06T 2207/20084; G06T 2207/30188; G06T 2210/12; G06T 2210/56; G06K 9/4604
See application file for complete search history.

(56) References Cited

U.S. PATENT DOCUMENTS

2018/0268566 A1* 9/2018 Houts .................... G06T 7/74
2018/0286117 A1* 10/2018 Redden ................ G06T 7/337

* cited by examiner

METHOD OF PERFORMING DENDROMETRY AND FOREST MAPPING

CROSS-REFERENCE TO RELATED APPLICATION

This application claims the benefit of U.S. Provisional Patent Application No. 62/618,158, filed on Jan. 17, 2018.

BACKGROUND

1. Field

The disclosure of the present patent application relates to dendrometry and forest mapping, and particularly to a machine vision-based method of mapping forests and determining the diameters of individual trees in the forest.

2. Description of the Related Art

Tree marking is a forest management technique used in forests around the world. Tree marking, which is traditionally a physical process, involves the marking of individual trees in a forest stand before the stand is treated or has some of the trees cut. Tree marking is used in industrial forestry to ensure that forestry contractors who are using machinery to harvest wood are cutting the right trees to maximize the efficacy of a silvicultural treatment that has been prescribed for the stand by a forester. Marking also provides a monitoring opportunity, as the system provides an easy opportunity for auditing.

Although numerous techniques for machine vision, pattern recognition and the like exist, the usage of such artificial intelligence-based tools for the automated marking of trees presents numerous technical and computational difficulties. Such an automated process would, initially, require the determination of a ground plane; i.e., a determination of a virtual plane corresponding to the ground for height measurements and comparison. Even under laboratory conditions, this is not a trivial task and typically requires expensive and sophisticated visual sensors, as well as large expenditures of time and computer power.

Following the above initial step, individual trees in a forest must be detected. Given the inherent degree of shade in a forest as well as the substantial uniformity of colors to be detected by an optical sensor, distinguishing individual trees from a visual image of a forest is again a difficult, and often expensive, task. Once individual trees have been detected, dendrometry must be performed to determine the size (typically the diameter) of the trees. Achieving high accuracy of such measurements, particularly given the irregular surfaces of trees and the necessity of making the measurements in an outdoor environment, presents a number of difficulties which must be overcome. Finally, after the measurements have been made, the locations of the trees must be mapped. Although a wide variety of techniques for making virtual maps are known, the mapping must be integrated into the overall machine vision-based system, preferably in an easily transportable and inexpensive manner. Thus, a method of performing dendrometry and forest mapping solving the aforementioned problems is desired.

SUMMARY

The method of performing dendrometry and forest mapping utilizes a stereoscopic camera system, coupled with a machine vision system, to determine the diameters at breast height of selected trees in a forest, based solely on calculations performed from recorded digital image data, as well as to generate a map showing the coordinates and calculated diameters of the selected trees in the forest. First and second digital images of at least one tree, and a surrounding region, are recorded with first and second cameras, respectively. The surrounding region includes at least a ground portion. First and second greyscale images are generated from the first and second digital images, respectively, and a set of pixel disparities therebetween is determined. A two-dimensional disparity map is generated from the set of pixel disparities, and three-dimensional reconstruction is performed on the two-dimensional disparity map and a set of camera calibration parameters to generate a three-dimensional point cloud.

A three-dimensional ground plane associated with the ground portion is then determined from the three-dimensional point cloud. Once the ground plane has been determined, a breast height of the at least one tree can be identified with respect to the ground plane. As is well known in the arts of forestry and dendrometry, "breast height" is typically defined as about 4.5 feet. The ground plane may be determined using a random sample consensus technique.

At least one set of first bounding box coordinates is generated about an identified tree stem of the at least one tree in the first greyscale image. The at least one set of first bounding box coordinates may be determined using convolutional neural network-based object detection. At least one set of second bounding box coordinates about the identified tree stem of the at least one tree in the second greyscale image can then be calculated from the at least one set of first bounding box coordinates, based on the two-dimensional disparity map. The at least one set of first bounding box coordinates and the at least one set of second bounding box coordinates are then evolved to respectively generate at least one set of first stem edge coordinates associated with the identified tree stem of the at least one tree in the first greyscale image and at least one set of second stem edge coordinates associated with the identified tree stem of the at least one tree in the second greyscale image.

A curve disparity between the at least one set of first stem edge coordinates and the at least one set of second stem edge coordinates is calculated, allowing at least one set of three-dimensional curves representative of three-dimensional stem edges of the identified tree stem of the at least one tree to be generated. At least one center line of the identified tree stem of the at least one tree is then determined, based on the at least one set of three-dimensional curves, and the diameter of the identified tree stem of the at least one tree can be determined at the calculated breast height.

A geographic location of the at least one tree is then determined. The geographic location may be determined by acquiring coordinates from the global positioning system (GPS) and combining the GPS coordinates with coordinates obtained through visual odometry. A map image is then generated which identifies the at least one tree, with the at least one tree tagged with the geographic location and the diameter thereof.

These and other features of the present subject matter will become readily apparent upon further review of the following specification.

BRIEF DESCRIPTION OF THE DRAWINGS

Similar reference characters denote corresponding features consistently throughout the attached drawings.

DETAILED DESCRIPTION OF THE PREFERRED EMBODIMENTS

Figure 1:
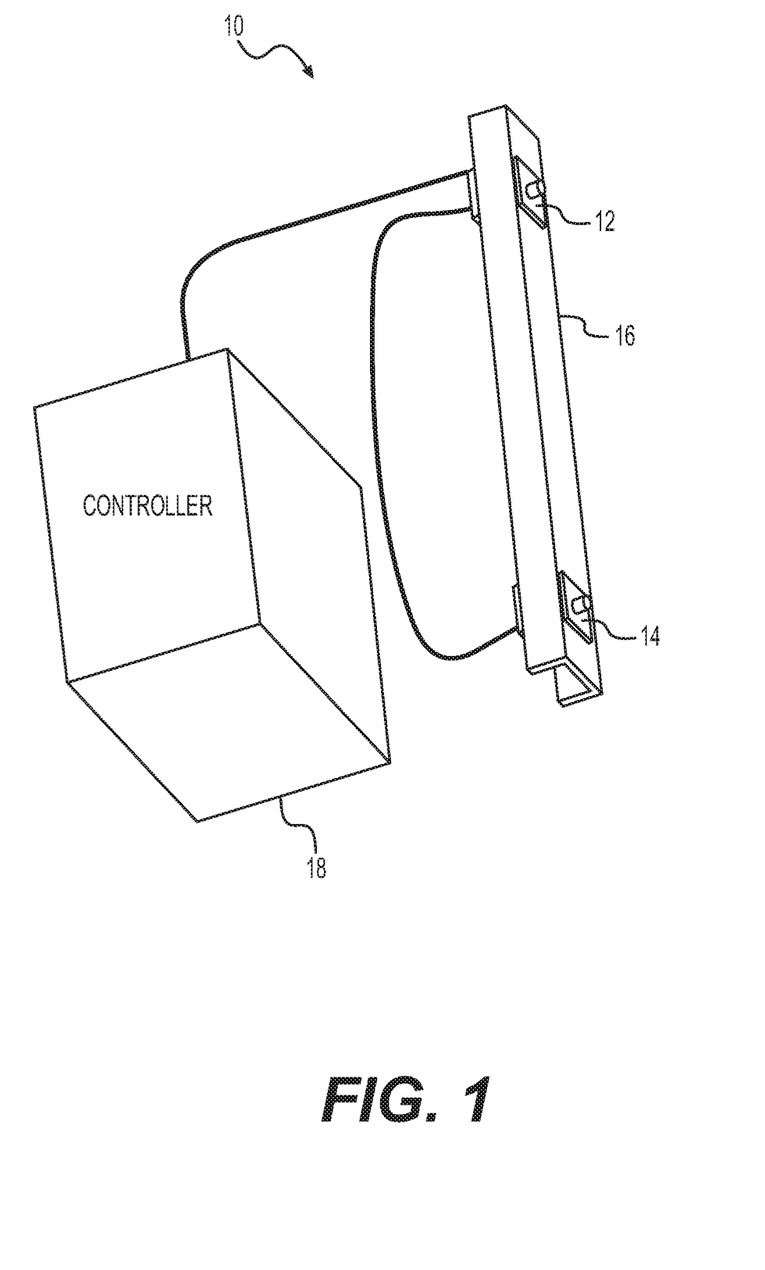
FIG. 1 is a perspective view of a stereoscopic camera system used with a method of performing dendrometry and forest mapping.

The method of performing dendrometry and forest mapping utilizes a stereoscopic camera system 10, coupled with a machine vision system, to determine the diameters at breast height of selected trees in a forest, based solely on calculations performed from recorded digital image data, as well as to generate a map showing the coordinates and calculated diameters of the selected trees in the forest. FIG. 1 illustrates a non-limiting example of such a stereoscopic camera system 10, which includes first and second digital cameras 12, 14, respectively, mounted to a bracket 16. Bracket 16 is adapted for mounting on any desired portable device, such as, for example, a vehicle, a piece of forest harvesting equipment, a handheld camera rig or the like.

It should be understood that any suitable type of digital cameras, visual sensors or the like may be utilized, and that bracket 16 is shown for exemplary purposes only. Any suitable type of mount may be utilized, dependent upon the particular types of cameras or sensors used, and dependent upon the particular configuration of the stereoscopic camera system 10; i.e., whether the stereoscopic camera system 10 is used in combination with a handheld rig, mounted on a vehicle or a piece of forest harvesting equipment, etc. It should be further understood that the spacing between first and second digital cameras 12, 14, respectively, is ultimately dependent upon the distance from the first and second digital cameras 12, 14 and the tree being measured, as well as the diameter classes being measured. In practice, a typical spacing may be, for example, between 10 cm and 30 cm. It is contemplated that a sliding, adjustable mount may be utilized, allowing adjustment of the distance between the first and second digital cameras 12, 14 to range between 10 cm and 50 cm.

First and second digital cameras 12, 14, respectively, are in electrical communication with controller 18, which performs the machine vision calculations described in detail below. It should be understood that such calculations may be performed by any suitable computer system, such as that diagrammatically shown in FIG. 2. Data is entered into controller 18 via any suitable type of user interface 26, and may be stored in memory 22, which may be any suitable type of computer readable and programmable memory and is preferably a non-transitory, computer readable storage medium. Calculations are performed by processor 20, which may be any suitable type of computer processor and may be displayed to the user on display 24, which may be any suitable type of computer display.

Figure 2:
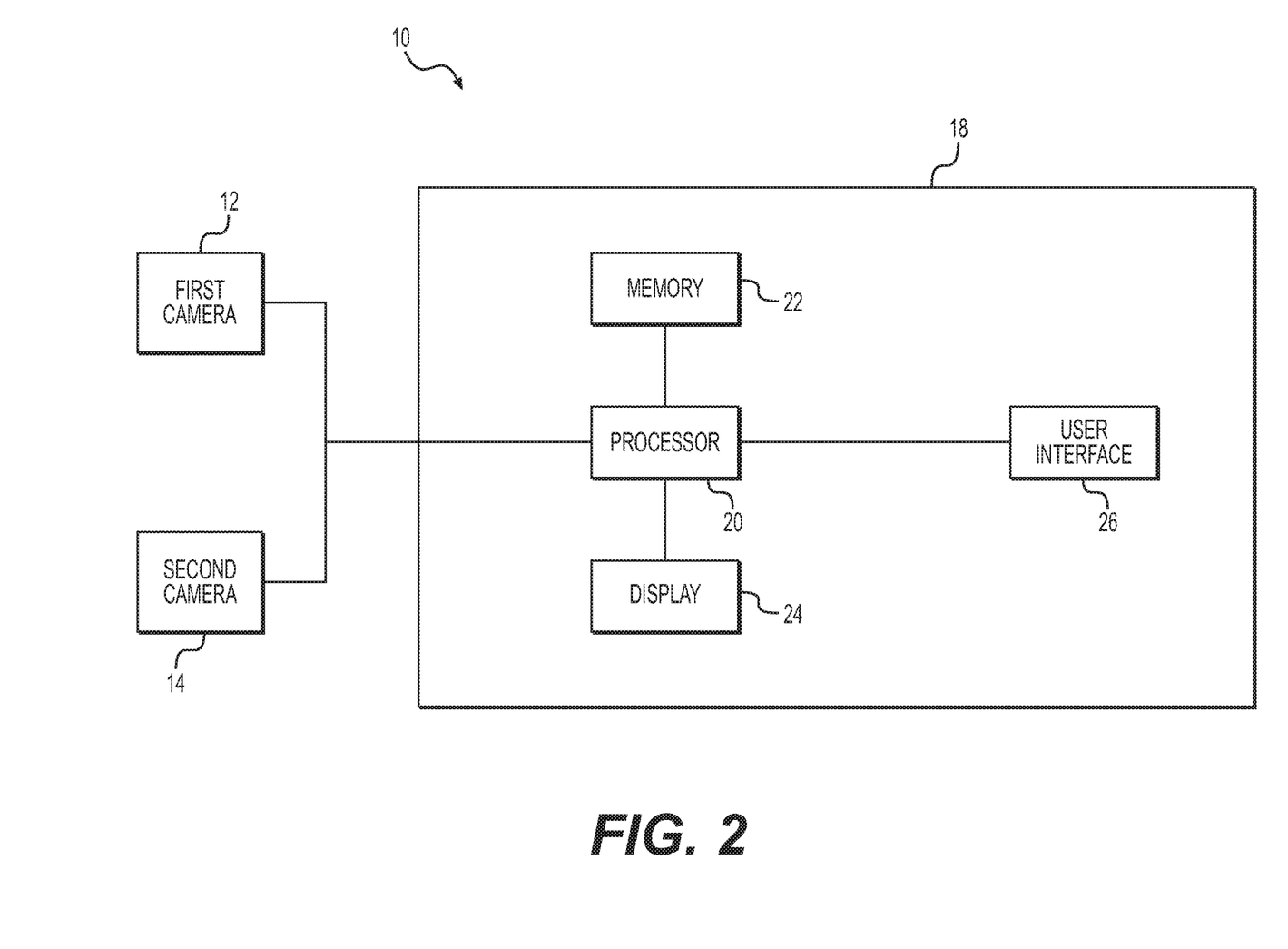
FIG. 2 is block diagram of system components of the stereoscopic camera system of FIG. 1.

Processor 20 may be associated with, or incorporated into, any suitable type of computing device, for example, a personal computer or a programmable logic controller. The display 24, the processor 20, the memory 22 and any associated computer readable recording media are in communication with one another by any suitable type of data bus, as is well known in the art. Examples of computer-readable recording media include non-transitory storage media, a magnetic recording apparatus, an optical disk, a magneto-optical disk, and/or a semiconductor memory (for example, RAM, ROM, etc.). Examples of magnetic recording apparatus that may be used in addition to memory 22, or in place of memory 22, include a hard disk device (HDD), a flexible disk (FD), and a magnetic tape (MT). Examples of the optical disk include a DVD (Digital Versatile Disc), a DVD-RAM, a CD-ROM (Compact Disc-Read Only Memory), and a CD-R (Recordable)/RW. It should be understood that non-transitory computer-readable storage media include all computer-readable media, with the sole exception being a transitory, propagating signal. The machine vision-based calculations and processes described below are further described in Wells, Lucas A. *A Vision System for Automatic Dendrometry and Forest Mapping*. 2018. Oregon State University, PhD. dissertation, which is hereby incorporated by reference in its entirety.

Although it should be understood that any suitable type of controller 18 may be utilized, in practice, controller 18 may be in the form of a portable computer, or integrated into a portable computer, which may be mounted in a rugged and portable case, allowing the stereoscopic camera system 10 to be easily and safely transported through a forest and the surrounding territory. Display 24 and user interface 26, which may be a keyboard or the like, are used to interface with controller 18 to set various parameters, such as, for example, frame rate, brightness, contrast, etc. Controller 18 and the first and second digital cameras 12, 14 may be powered by one or more rechargeable batteries, which may also be carried in or with the case. As will be described in greater detail below, controller 18 processes the stereo images in real time to measure the diameters of trees and display the output to the user on display 24.

Figure 3:
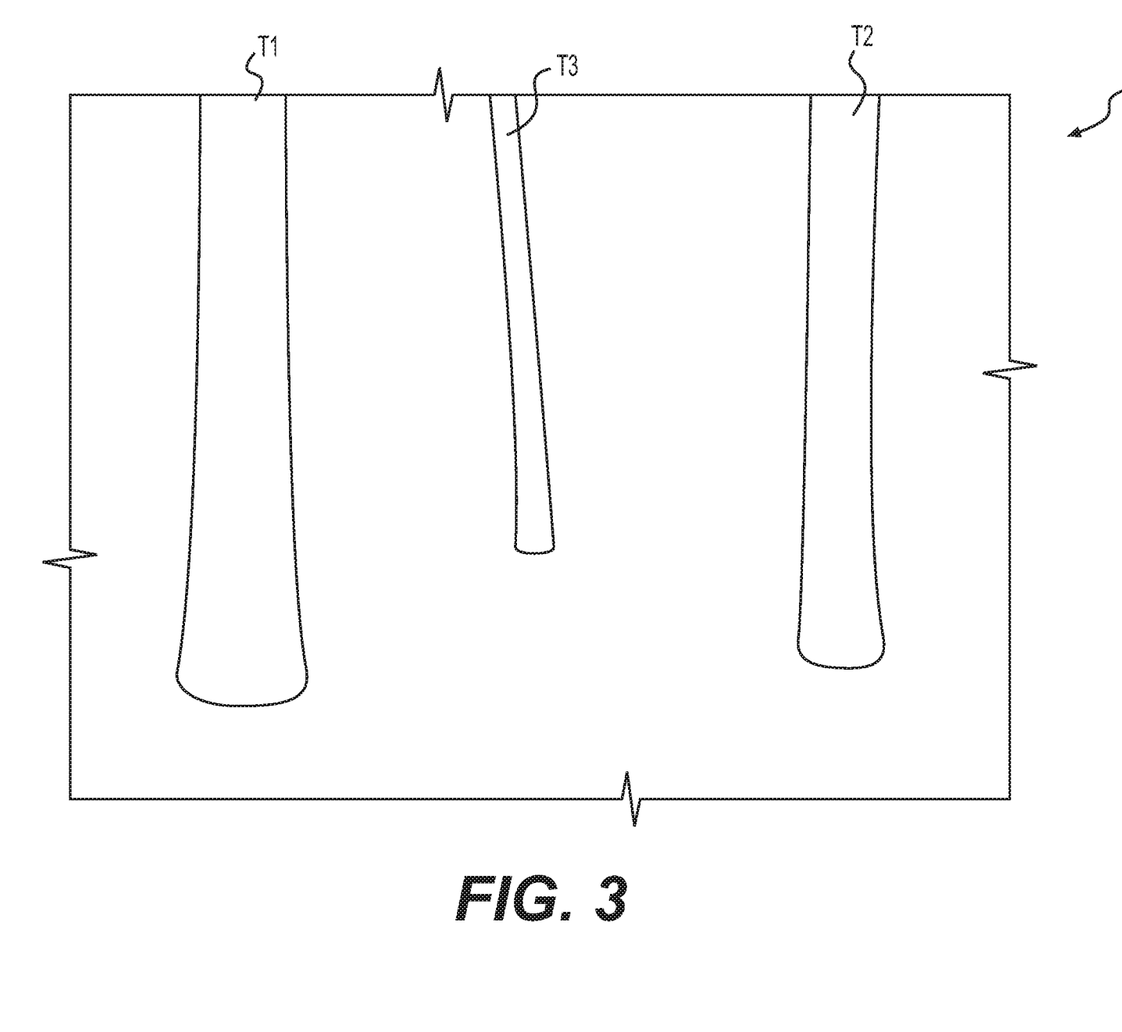
FIG. 3 illustrates an image of trees in a forest recorded as an initial step of the method of performing dendrometry and forest mapping.

First and second digital images of at least one tree, and a surrounding region, are recorded with first and second cameras, respectively. The surrounding region includes at least a ground portion. For purposes of simplification, FIG. 3 shows only a single image, recorded by first digital camera 12, although it should be understood that the stereoscopic camera system 10 also makes use of second digital camera 14, and a similar image (though shifted by the distance between cameras) is also produced thereby. In the image I of FIG. 3, three trees T1, T2 and T3 are identified as being of interest. In practical use, such trees may be identified for cutting, treatment, etc., similar to conventional marking used in traditional forestry. It should be understood that the three trees T1, T2 and T3 are shown in image I of FIG. 3 for purposes of illustration and simplification only. In practice, the stereoscopic camera system 10 may be used in a forest, which would typically have far more trees, at varying distances, contained within the boundaries of image I. Thus, only the three trees T1, T2 and T3 are shown in order to provide clarity for the below discussion.

First and second greyscale images are generated from the first and second digital images, respectively, and a set of pixel disparities therebetween is determined. A two-dimensional disparity map is generated from the set of pixel disparities, and three-dimensional reconstruction is performed on the two-dimensional disparity map and a set of camera calibration parameters to generate a three-dimensional point cloud. It should be understood that such generation may be performed by any suitable technique, as is well known in the art. A non-limiting example of such a technique is described in Hirschmuller, Heiko. "Stereo processing by semiglobal matching and mutual information." *IEEE Transactions on pattern analysis and machine intelligence* 30.2 (2008): 328-341, which is hereby incorporated by reference in its entirety.

Figure 4:
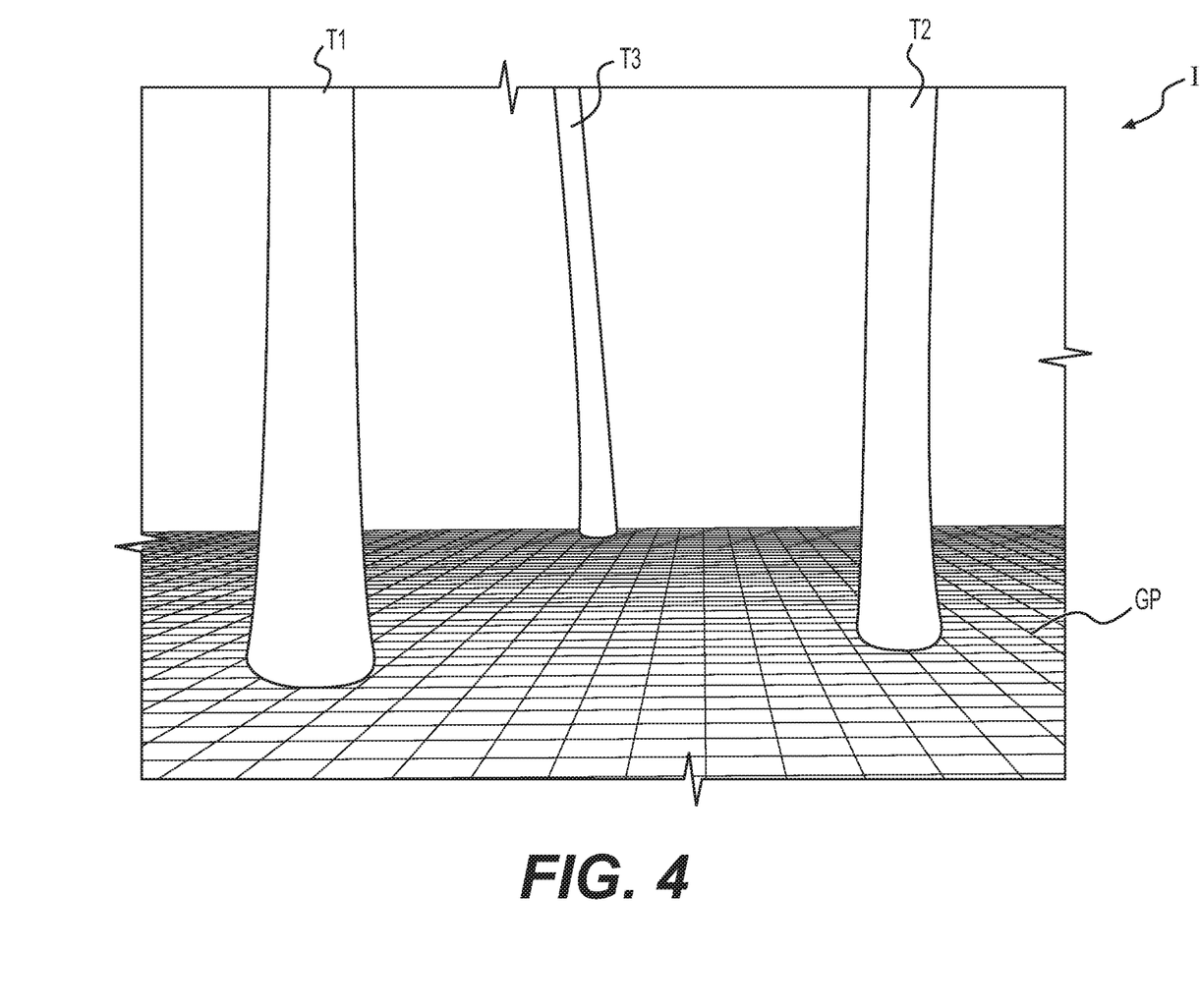
FIG. 4 illustrates identification of a ground plane in the image of FIG. 3.
Figure 5:
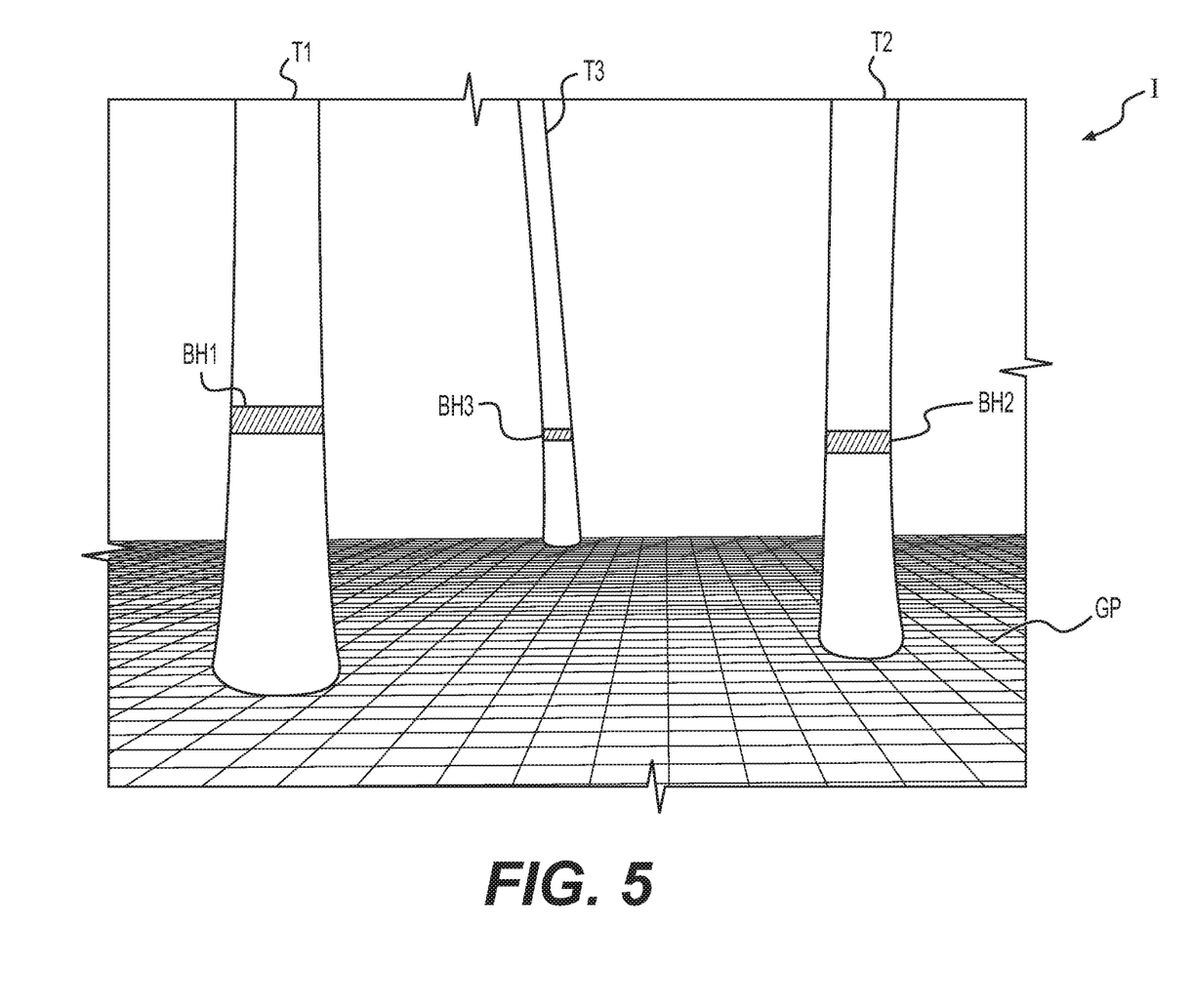
FIG. 5 illustrates identification of breast height for each selected tree in the image of FIG. 3.

As shown in FIG. 4, a three-dimensional ground plane GP associated with the ground portion is then determined from the three-dimensional point cloud. Once the ground plane GP has been determined, a breast height of the at least one tree can be identified with respect to the ground plane GP. As is well known in the arts of forestry and dendrometry, "breast height" is typically defined as about 4.5 feet. In the example of FIG. 5, three breast heights BH1, BH2 and BH3 have been respectively determined for trees T1, T2 and T3, where the height is measured vertically from ground plane GP. It should be understood that determination of the ground plane GP may be performed by any suitable technique, such as, for example, random sample consensus (RANSAC). The RANSAC technique, described above as a non-limiting example of a ground plane determination technique, is described in Fischler, Martin A., and Robert C. Bolles. "Random sample consensus: a paradigm for model fitting with applications to image analysis and automated cartography." *Communications of the ACM* 24.6 (1981): 381-395, which is hereby incorporated by reference in its entirety. The usage of RANSAC to determine ground plane from stereoscopic images, including calculation of disparity and three-dimensional point clouds, may be performed by any suitable techniques, such as, for example, those shown in U.S. Pat. No. 8,933,925 B2, U.S. Pat. No. 9,275,462 B2; and U.S. Patent Application Publication No. US 2017/0142405 A1, each of which is hereby incorporated by reference in its entirety.

Figure 6:
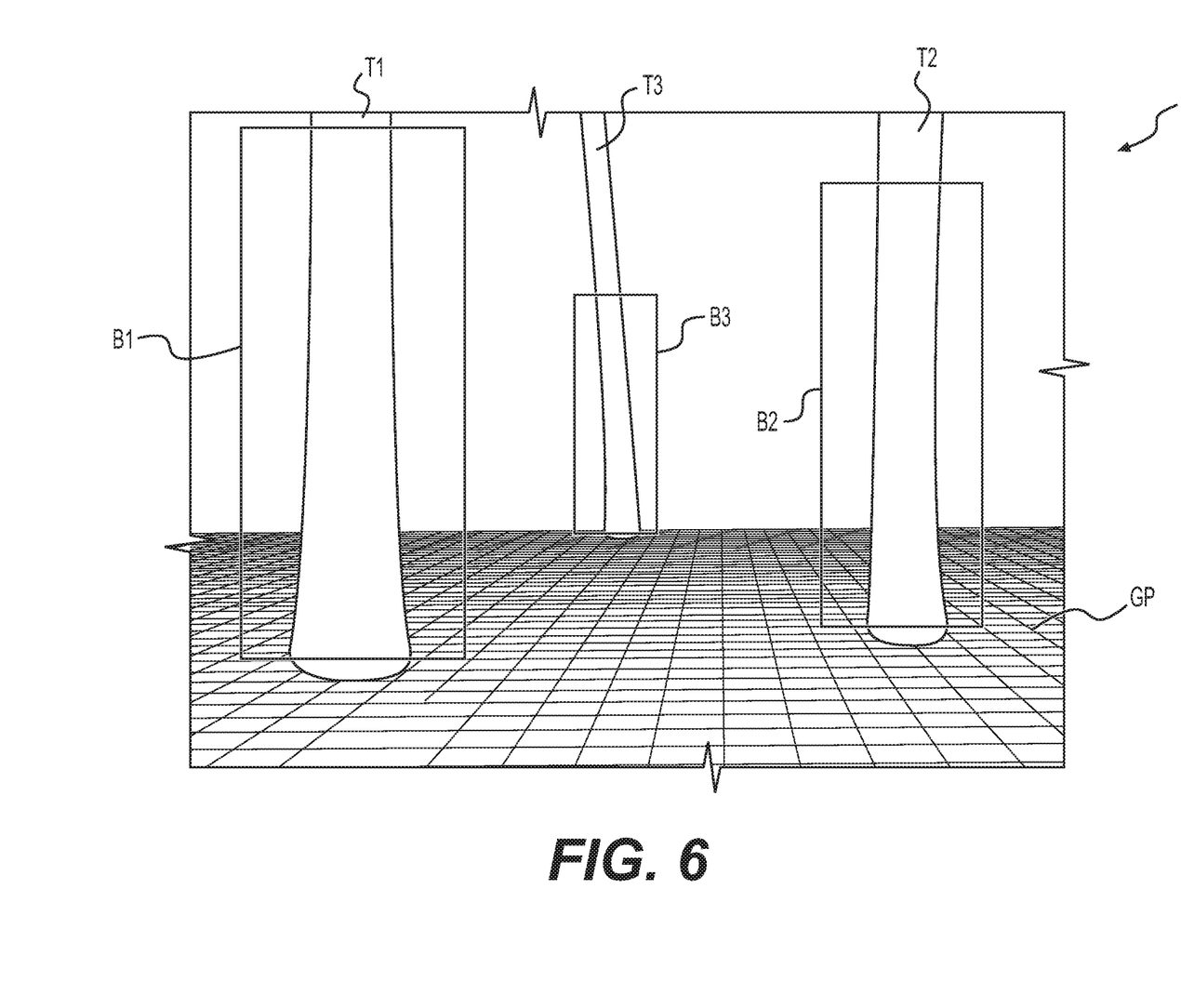
FIG. 6 illustrates the generation of bounding box coordinates for each selected tree in the image of FIG. 3.

At least one set of first bounding box coordinates is generated about an identified tree stem of the at least one tree in the first greyscale image. In the example image I of FIG. 6, bounding boxes B1, B2 and B3 have been generated about the tree stems of trees T1, T2 and T3. At least one set of second bounding box coordinates about the identified tree stem of the at least one tree in the second greyscale image can then be calculated from the at least one set of first bounding box coordinates, based on the two-dimensional disparity map. It should be understood that the bounding boxes may be generated by any suitable type of object detection technique, such as, for example, convolutional neural network (CNN)-based object detection. Examples of such CNN-based object detection techniques are well known in the art. Non-limiting examples of such CNN-based object detection techniques include those shown in Redmon, Joseph, et al. "You only look once: Unified, real-time object detection." *Proceedings of the IEEE conference on computer vision and pattern recognition*. 2016; Redmon, Joseph, and Ali Farhadi. "YOLO9000: better, faster, stronger." *arXiv preprint* (2017); and Redmon, Joseph, and Ali Farhadi. "Yolov3: An incremental improvement." *arXiv preprint* (2018), each of which is hereby incorporated by reference in their entirety. Additionally, examples of the usage of modified YOLO-based techniques for CNN-based object detection with bounding box generation are shown in U.S. Patent Application Publication No. US 2018/0330198 A1; U.S. Pat. No. 9,760,806 B1; and U.S. Pat. No. 10,147,019 B2, each of which is hereby incorporated by reference in their entirety.

The at least one set of first bounding box coordinates and the at least one set of second bounding box coordinates are then evolved to respectively generate at least one set of first stem edge coordinates associated with the identified tree stem of the at least one tree in the first greyscale image and at least one set of second stem edge coordinates associated with the identified tree stem of the at least one tree in the second greyscale image. However, prior to determination of the stem edges, a stem tracking procedure is performed. In an initial measurement step of the stem tracking procedure, the YOLO-based object detection described above is run to assign a depth value to the associated bounding box. Estimated egomotion of the first and second cameras is then used to predict the location of a detection from a previous frame in the current frame. Matching is then performed to find the optimal matching strategy between the predicted detections and new detections which are provided in the measurement step. Lastly, correction is performed to update the tracking list by replacing the predictions with matched measurements from the detector, ultimately for insertion and deletion of stems from the tracking list.

Figure 7:
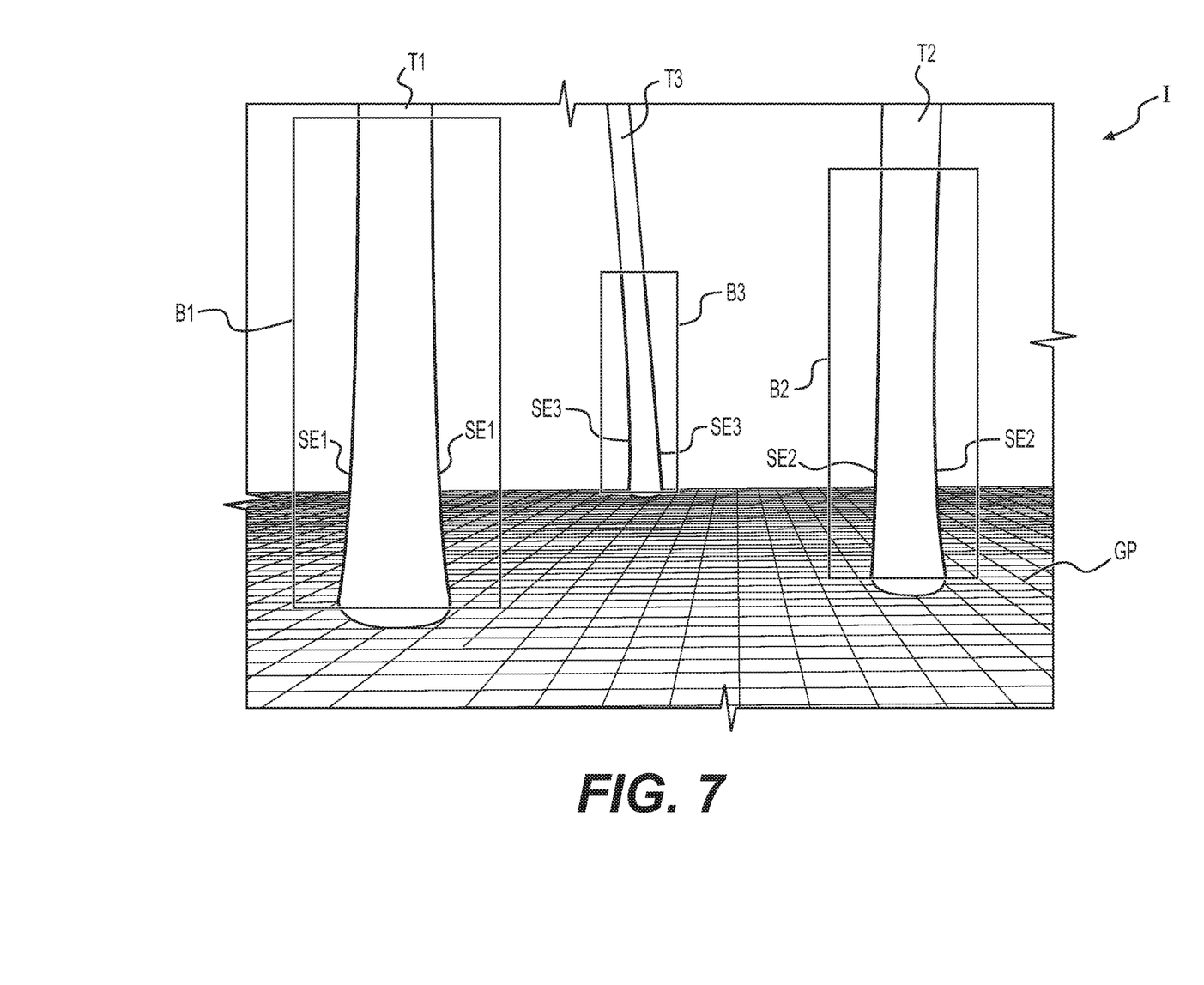
FIG. 7 illustrates evolution of the bounding box coordinates to identify stem edges of the tree stems of the selected trees in the image of FIG. 3.

In the example of FIG. 7, stem edges SE1, SE2 and SE3 have been determined within bounding boxes B1, B2 and B3, respectively, for trees T1, T2 and T3. In order to determine the stem edges, detection is performed by localizing the occluding contours of the tree stems within the bounding box in both the first and second stereo images, reconstructing the stems, and mapping their positions to the object coordinate frame. This process may be performed using an active contour model (ACM) technique. It should be understood that such active contour modeling techniques are well known in the art, and that any suitable ACM or similar technique may be used for detection and determination of the stem edges. As a non-limiting example, one such ACM technique is described in Kass, Michael, Andrew Witkin, and Demetri Terzopoulos. "Snakes: Active contour models." *International journal of computer vision* 1.4 (1988): 321-331, which is hereby incorporated by reference in its entirety.

In use, the two-dimensional projections of the tree stems in the images are represented with a set of planar parametric curves that evolve according to an energy formulation based on the gradients of the images and prior knowledge of the shape of tree stems. Following energy minimization, the curves are reconstructed to three dimensions where, as discussed in greater detail below, diameters are measured along the height of the stem. As is well known the art, ACMs are represented using opened or closed parametric curves in the image plane. These curves are influenced by external forces, which attract the curves to boundaries in the image, and internal forces that govern the deformations of the curves. ACMs can also be viewed as an energy minimization technique for finding the best-fit deformable shape to an object in an image, subject to the deformations permitted by the internal forces, where the term "energy" refers to a quantity describing the state of the curve in the time domain and is the sum of external and internal energy. The energy of the curve is the quantity which is minimized, while the "forces" indicate how to move the curve in order to decrease its energy. Once the curve reaches a minimum, the forces will balance and the curve's position will converge, given that the energy formulation is numerically stable. In the present method, the formulation of external and internal energy applies specifically to the problem of localizing curves to the edges SE1, SE2 and SE3 of the tree stems. Here, a curve disparity between the at least one set of first stem edge coordinates and the at least one set of second stem edge coordinates is calculated, allowing at least one set of three-dimensional curves representative of three-dimensional stem edges of the identified tree stem of the at least one tree to be generated. Examples of using ACMs for edge detection in images are show in U.S. Pat. No. 9,065,968 B2 and U.S. Pat. No. 6,546,117 B1, each of which is hereby incorporated by reference in its entirety.

Figure 8:
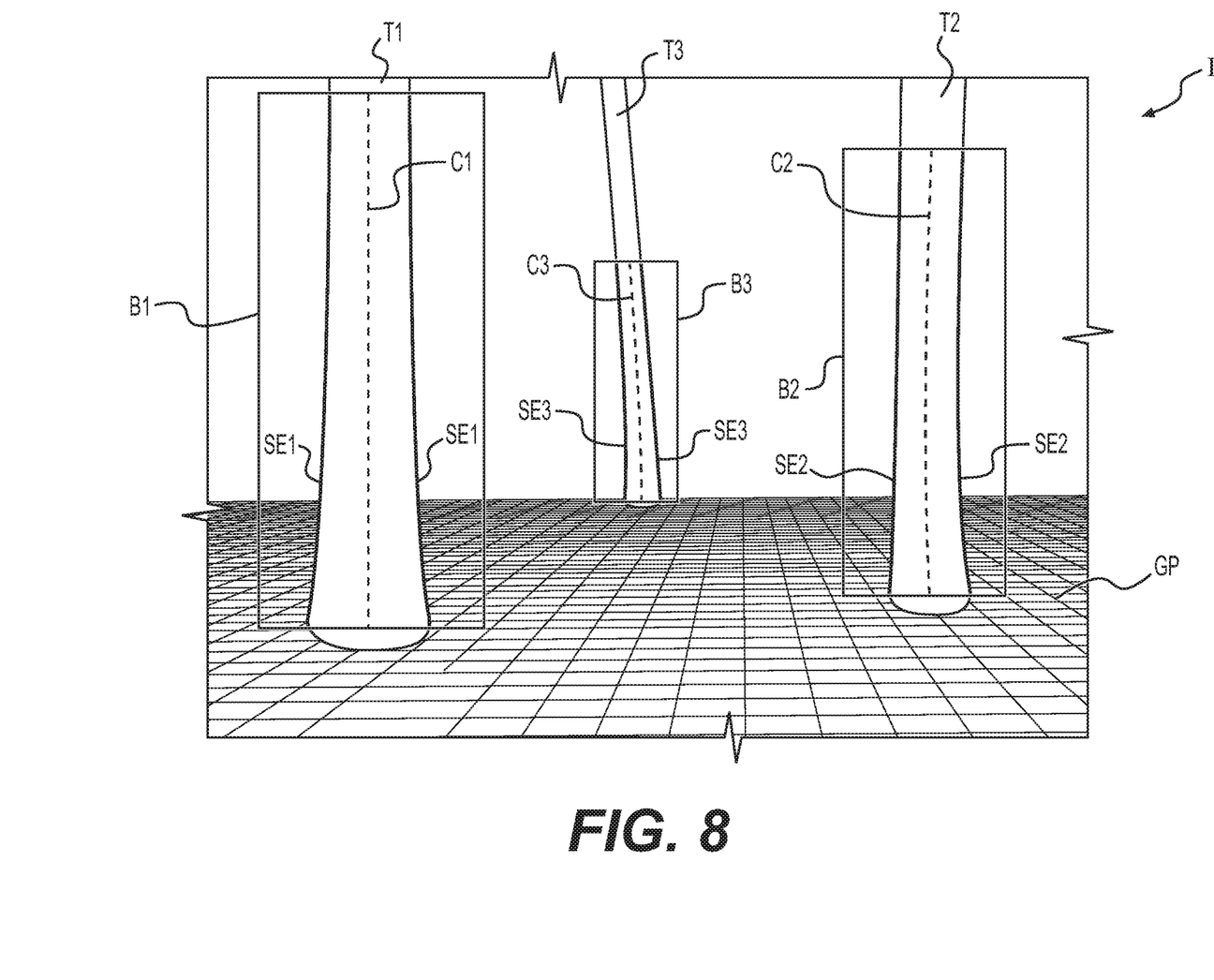
FIG. 8 illustrates identification of center lines for each identified tree stem in the image of FIG. 3.
Figure 9:
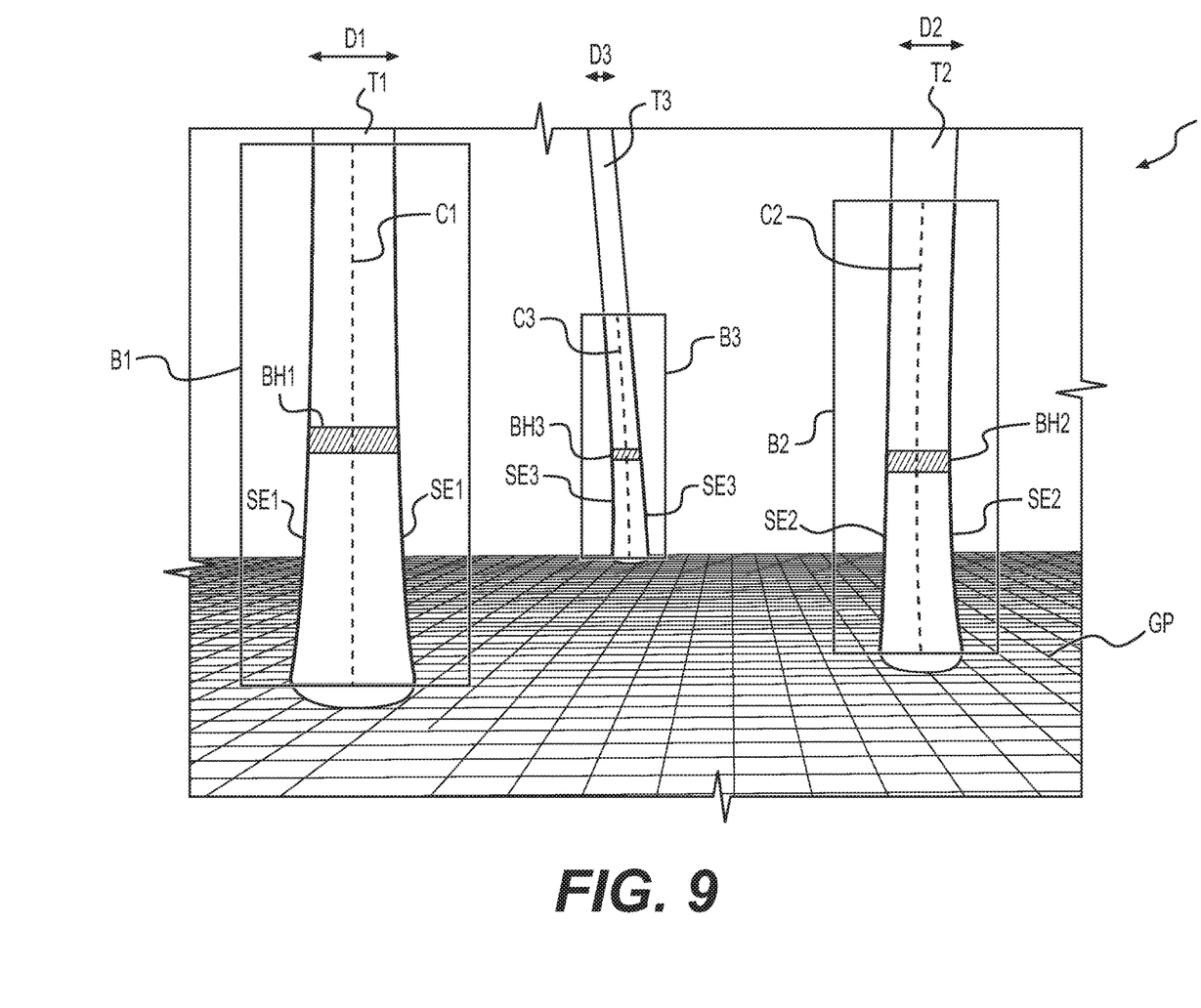
FIG. 9 illustrates the determination of diameter at breast height for each identified tree stem in the image of FIG. 3.

At least one center line of the identified tree stem of the at least one tree is then determined, based on the at least one set of three-dimensional curves. In the example of FIG. 8, the center lines C1, C2 and C3, corresponding to stem edges SE1, SE2 and SE3, respectively, have been determined. The diameter of the identified tree stem of the at least one tree can be determined at the calculated breast height. In the example of FIG. 9, diameters D1, D2 and D3 at respective breast heights BH1, BH2 and BH3 are easily determined by measuring the distance between opposed stem edges at the corresponding breast height. An example of determining the contours of a cylindrical shape using an active contouring model, including determination of a centerline, using energy minimization with diameter measurement and display, is shown in U.S. Pat. No. 8,755,576 B2, which is hereby incorporated by reference in its entirety.

Figure 10:
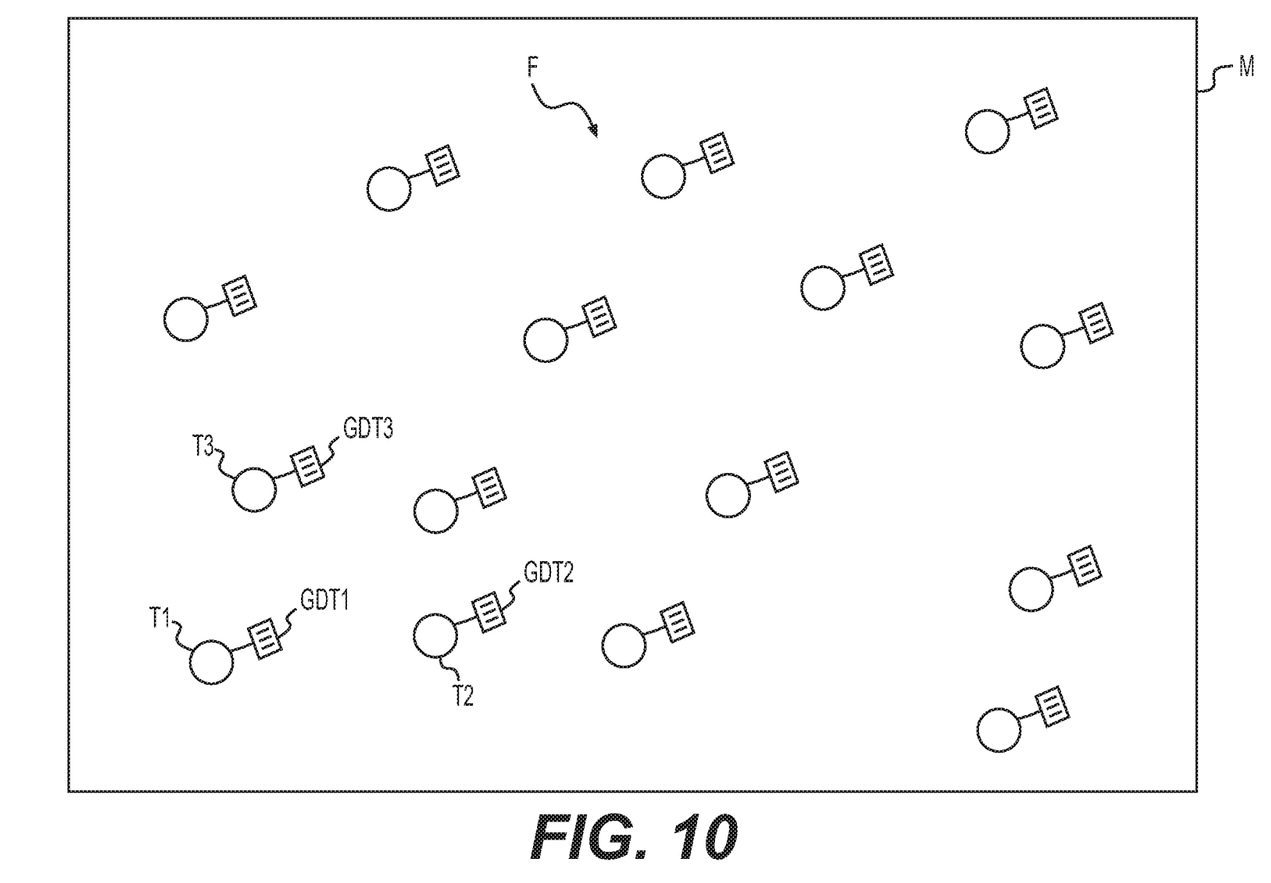
FIG. 10 is an exemplary map image generated by the method of performing dendrometry and forest mapping.

A geographic location of the at least one tree is then determined. The geographic location may be determined by acquiring coordinates from the global positioning system (GPS) and combining the GPS coordinates with coordinates obtained through visual odometry (VO). A map image is then generated which identifies the at least one tree, with the at least one tree tagged with the geographic location and the diameter thereof. It should be understood that the map image M shown in FIG. 10 is shown for purposes of illustration only. As shown, each selected tree in forest F is shown in map image M. For purposes of simplification, only trees T1, T2 and T3 have been identified, and each of these trees has been respectively tagged with a geographic and dendrometry tag GDT1, GDT2 and GDT3, respectively, showing the geographic coordinates and diameter information associated with each tree. However, in practice, each selected tree within forest F may have its own geographic and dendrometry tag.

In the above, direct visual odometry may be used, as is conventionally known. It should be understood that any suitable direct visual odometry technique may be utilized, and it should be further understood that any suitable method may be utilized for combining the GPS data with the VO data. As a non-limiting example, such direct visual odometry is described in Lucas, Bruce D., and Takeo Kanade. "An iterative image registration technique with an application to stereo vision." (1981): 674-679.

As described above, GPS location may be combined with VO data. This is due to the often intermittent and degraded GPS reception found in forests. Thus, the possibly degraded GPS coordinates may be fused with VO data to provide a globally consistent position estimate. Once this estimate has been found, a graph-based simultaneous localization and mapping (SLAM) technique may be used for simultaneously refining the estimated path and map. It should be understood that any suitable type of graph-based SLAM technique may be used. Grisetti, Giorgio, et al. "A tutorial on graph-based SLAM." *IEEE Intelligent Transportation Systems Magazine* 2.4 (2010): 31-43 describes such techniques, cited here as a non-limiting example. It should be understood that the GPS data may be combined with the VO data using any suitable technique. Examples of the fusion of GPS coordinate data with VO location data are shown in U.S. Pat. No. 9,734,414 B2 and U.S. Patent Application Publication US 2018/0031387 A1, each of which is hereby incorporated by reference in its entirety.

In practice, it is well known that GPS sensors operating under forest canopy conditions often yield spurious and unreliable positional readings. Thus, as described above, in the method of performing dendrometry and forest mapping, the GPS signal is filtered to only retain low-error positional data, and the intermediate positions are maintained via visual odometry. The visual odometry tracks features between frames in the video stream to estimate the movement of the cameras. The GPS and visual odometry data are embedded in the SLAM algorithm to produce a globally consistent stem map of the forest.

This generated map image M provides a visual image identifying trees to harvest and trees to leave in the forest F, for example. The map image data is stored to further provide land managers with a stem map of the trees harvested and not harvested. Foresters may use this information to monitor the harvest. As noted above, first and second digital cameras 12, 14 may be mounted on a handheld rig. Using the handheld application, foresters could create a map of a stand of trees while walking through the forest, capturing a video stream of data. This information regarding the location and diameter of each identified tree could then be paired with height data to create a complete map of the trees. Foresters could then use this information to develop silvicultural prescriptions, identify trees for harvest, and maintain an inventory of trees. It should be understood that in addition to being displayed to the user on display 24, the map image data may be centrally stored, allowing the map image M to be displayed on any computer, such as one located at a base station, or be transmitted or copied to a portable or mobile device, such as a portable computer, smartphone or the like.

It is to be understood that the method of performing dendrometry and forest mapping is not limited to the specific embodiments described above, but encompasses any and all embodiments within the scope of the generic language of the following claims enabled by the embodiments described herein, or otherwise shown in the drawings or described above in terms sufficient to enable one of ordinary skill in the art to make and use the claimed subject matter.

We claim:

1. A method of performing dendrometry and forest mapping, comprising the steps of:
    recording first and second digital images of at least one tree and a surrounding region with first and second cameras, respectively, wherein the surrounding region includes at least a ground portion;
    generating first and second greyscale images from the first and second digital images, respectively;
    determining a set of pixel disparities between the first and second greyscale images;
    generating a two-dimensional disparity map from the set of pixel disparities;
    generating a three-dimensional point cloud through three-dimensional reconstruction performed on the two-dimensional disparity map;
    determining a three-dimensional ground plane associated with the ground portion from the three-dimensional point cloud;

generating at least one set of first bounding box coordinates about an identified tree stem of the at least one tree in the first greyscale image;
calculating at least one set of second bounding box coordinates about the identified tree stem of the at least one tree in the second greyscale image based on the two-dimensional disparity map;
generating at least one set of first stem edge coordinates associated with the identified tree stem of the at least one tree in the first greyscale image;
generating at least one set of second stem edge coordinates associated with the identified tree stem of the at least one tree in the second greyscale image;
calculating a curve disparity between the at least one set of first stem edge coordinates and the at least one set of second stem edge coordinates;
generating at least one set of three-dimensional curves representative of three-dimensional stem edges of the identified tree stem of the at least one tree based on the curve disparity;
identifying at least one center line of the identified tree stem of the at least one tree based on the at least one set of three-dimensional curves;
determining a diameter of the identified tree stem of the at least one tree at breast height with respect to the three-dimensional ground plane, based on the at least one set of three-dimensional curves and the at least one center line;
determining a geographic location of the at least one tree; and
generating a map image identifying the at least one tree and tagged with the geographic location and the diameter thereof.

2. The method of performing dendrometry and forest mapping as recited in claim 1, wherein the step of generating the three-dimensional point cloud further comprises three-dimensional reconstruction performed on a set of camera calibration parameters.

3. The method of performing dendrometry and forest mapping as recited in claim 1, wherein the step of determining the geographic location comprises obtaining global positioning system coordinates of the at least one tree.

4. The method of performing dendrometry and forest mapping as recited in claim 3, wherein the step of determining the geographic location further comprises combining the global positioning system coordinates of the at least one tree with a set of visual odometry coordinates.

5. The method of performing dendrometry and forest mapping as recited in claim 1, wherein the step of determining the three-dimensional ground plane comprises performing random sample consensus.

6. The method of performing dendrometry and forest mapping as recited in claim 1, wherein the step of generating the at least one set of first bounding box coordinates about the identified tree stem of the at least one tree in the first greyscale image is performed using convolutional neural network-based object detection.

7. The method of performing dendrometry and forest mapping as recited in claim 1, wherein the step of generating the at least one set of first stem edge coordinates associated with the identified tree stem of the at least one tree in the first greyscale image comprises the steps of:
localizing occluding contours of the identified tree stem of the at least one tree in the first greyscale image within the at least one set of first bounding box coordinates;
reconstructing a first stem image from the localized occluding contours; and
mapping a position of the first stem image to a first object coordinate frame.

8. The method of performing dendrometry and forest mapping as recited in claim 7, wherein the step of generating the at least one set of second stem edge coordinates associated with the identified tree stem of the at least one tree in the second greyscale image comprises the steps of:
localizing occluding contours of the identified tree stem of the at least one tree in the second greyscale image within the at least one set of second bounding box coordinates;
reconstructing a second stem image from the localized occluding contours; and
mapping a position of the second stem image to a second object coordinate frame.

9. The method of performing dendrometry and forest mapping as recited in claim 8, wherein the step of generating the at least one set of first stem edge coordinates associated with the identified tree stem of the at least one tree in the first greyscale image, and the step of generating the at least one set of second stem edge coordinates associated with the identified tree stem of the at least one tree in the second greyscale image, each comprise performance of an active contour model process.

10. A method of performing dendrometry and forest mapping, comprising the steps of:
recording first and second digital images of at least one tree and a surrounding region with first and second cameras, respectively, wherein the surrounding region includes at least a ground portion;
generating first and second greyscale images from the first and second digital images, respectively;
determining a set of pixel disparities between the first and second greyscale images;
generating a two-dimensional disparity map from the set of pixel disparities;
generating a three-dimensional point cloud through three-dimensional reconstruction performed on the two-dimensional disparity map;
determining a three-dimensional ground plane associated with the ground portion from the three-dimensional point cloud using random sample consensus;
generating at least one set of first bounding box coordinates about an identified tree stem of the at least one tree in the first greyscale image;
calculating at least one set of second bounding box coordinates about the identified tree stem of the at least one tree in the second greyscale image based on the two-dimensional disparity map;
generating at least one set of first stem edge coordinates associated with the identified tree stem of the at least one tree in the first greyscale image;
generating at least one set of second stem edge coordinates associated with the identified tree stem of the at least one tree in the second greyscale image;
calculating a curve disparity between the at least one set of first stem edge coordinates and the at least one set of second stem edge coordinates;
generating at least one set of three-dimensional curves representative of three-dimensional stem edges of the identified tree stem of the at least one tree based on the curve disparity;
identifying at least one center line of the identified tree stem of the at least one tree based on the at least one set of three-dimensional curves;
determining a diameter of the identified tree stem of the at least one tree at breast height with respect to the three-dimensional ground plane, based on the at least one set of three-dimensional curves and the at least one center line;

determining a geographic location of the at least one tree; and generating a map image identifying the at least one tree and tagged with the geographic location and the diameter thereof.

11. The method of performing dendrometry and forest mapping as recited in claim 10, wherein the step of generating the three-dimensional point cloud further comprises three-dimensional reconstruction performed on a set of camera calibration parameters.

12. The method of performing dendrometry and forest mapping as recited in claim 10, wherein the step of determining the geographic location comprises obtaining global positioning system coordinates of the at least one tree.

13. The method of performing dendrometry and forest mapping as recited in claim 12, wherein the step of determining the geographic location further comprises combining the global positioning system coordinates of the at least one tree with a set of visual odometry coordinates.

14. The method of performing dendrometry and forest mapping as recited in claim 10, wherein the step of generating the at least one set of first bounding box coordinates about the identified tree stem of the at least one tree in the first greyscale image is performed using convolutional neural network-based object detection.

15. The method of performing dendrometry and forest mapping as recited in claim 10, wherein the step of generating the at least one set of first stem edge coordinates associated with the identified tree stem of the at least one tree in the first greyscale image comprises the steps of:

localizing occluding contours of the identified tree stem of the at least one tree in the first greyscale image within the at least one set of first bounding box coordinates;

reconstructing a first stem image from the localized occluding contours; and mapping a position of the first stem image to a first object coordinate frame.

16. The method of performing dendrometry and forest mapping as recited in claim 15, wherein the step of generating the at least one set of second stem edge coordinates associated with the identified tree stem of the at least one tree in the second greyscale image comprises the steps of:

localizing occluding contours of the identified tree stem of the at least one tree in the second greyscale image within the at least one set of second bounding box coordinates;

reconstructing a second stem image from the localized occluding contours; and mapping a position of the second stem image to a second object coordinate frame.

17. The method of performing dendrometry and forest mapping as recited in claim 16, wherein the step of generating the at least one set of first stem edge coordinates associated with the identified tree stem of the at least one tree in the first greyscale image, and the step of generating the at least one set of second stem edge coordinates associated with the identified tree stem of the at least one tree in the second greyscale image, each comprise performance of an active contour model process.

18. A method of performing dendrometry and forest mapping, comprising the steps of:

recording first and second digital images of at least one tree and a surrounding region with first and second cameras, respectively, wherein the surrounding region includes at least a ground portion;

generating first and second greyscale images from the first and second digital images, respectively;

determining a set of pixel disparities between the first and second greyscale images;

generating a two-dimensional disparity map from the set of pixel disparities;

generating a three-dimensional point cloud through three-dimensional reconstruction performed on the two-dimensional disparity map;

determining a three-dimensional ground plane associated with the ground portion from the three-dimensional point cloud using random sample consensus;

generating at least one set of first bounding box coordinates about an identified tree stem of the at least one tree in the first greyscale image using convolutional neural network-based object detection;

calculating at least one set of second bounding box coordinates about the identified tree stem of the at least one tree in the second greyscale image based on the two-dimensional disparity map;

generating at least one set of first stem edge coordinates associated with the identified tree stem of the at least one tree in the first greyscale image;

generating at least one set of second stem edge coordinates associated with the identified tree stem of the at least one tree in the second greyscale image;

calculating a curve disparity between the at least one set of first stem edge coordinates and the at least one set of second stem edge coordinates;

generating at least one set of three-dimensional curves representative of three-dimensional stem edges of the identified tree stem of the at least one tree based on the curve disparity;

identifying at least one center line of the identified tree stem of the at least one tree based on the at least one set of three-dimensional curves;

determining a diameter of the identified tree stem of the at least one tree at breast height with respect to the three-dimensional ground plane, based on the at least one set of three-dimensional curves and the at least one center line;

determining a geographic location of the at least one tree; and generating a map image identifying the at least one tree and tagged with the geographic location and the diameter thereof.

19. The method of performing dendrometry and forest mapping as recited in claim 18, wherein the step of determining the geographic location comprises obtaining global positioning system coordinates of the at least one tree.

20. The method of performing dendrometry and forest mapping as recited in claim 19, wherein the step of determining the geographic location further comprises combining the global positioning system coordinates of the at least one tree with a set of visual odometry coordinates.

* * * * *

UNITED STATES PATENT AND TRADEMARK OFFICE
CERTIFICATE OF CORRECTION

PATENT NO. : 11,481,972 B2
APPLICATION NO. : 16/249529
DATED : October 25, 2022
INVENTOR(S) : Edward Carl Messerlie et al.

It is certified that error appears in the above-identified patent and that said Letters Patent is hereby corrected as shown below:

On the Title Page

Under Item (71) Applicant, please add the second applicant "OREGON STATE UNIVERSITY, Corvallis, OR (US)".

Signed and Sealed this
Sixth Day of December, 2022

Katherine Kelly Vidal
*Director of the United States Patent and Trademark Office*